UNITED STATES PATENT OFFICE.

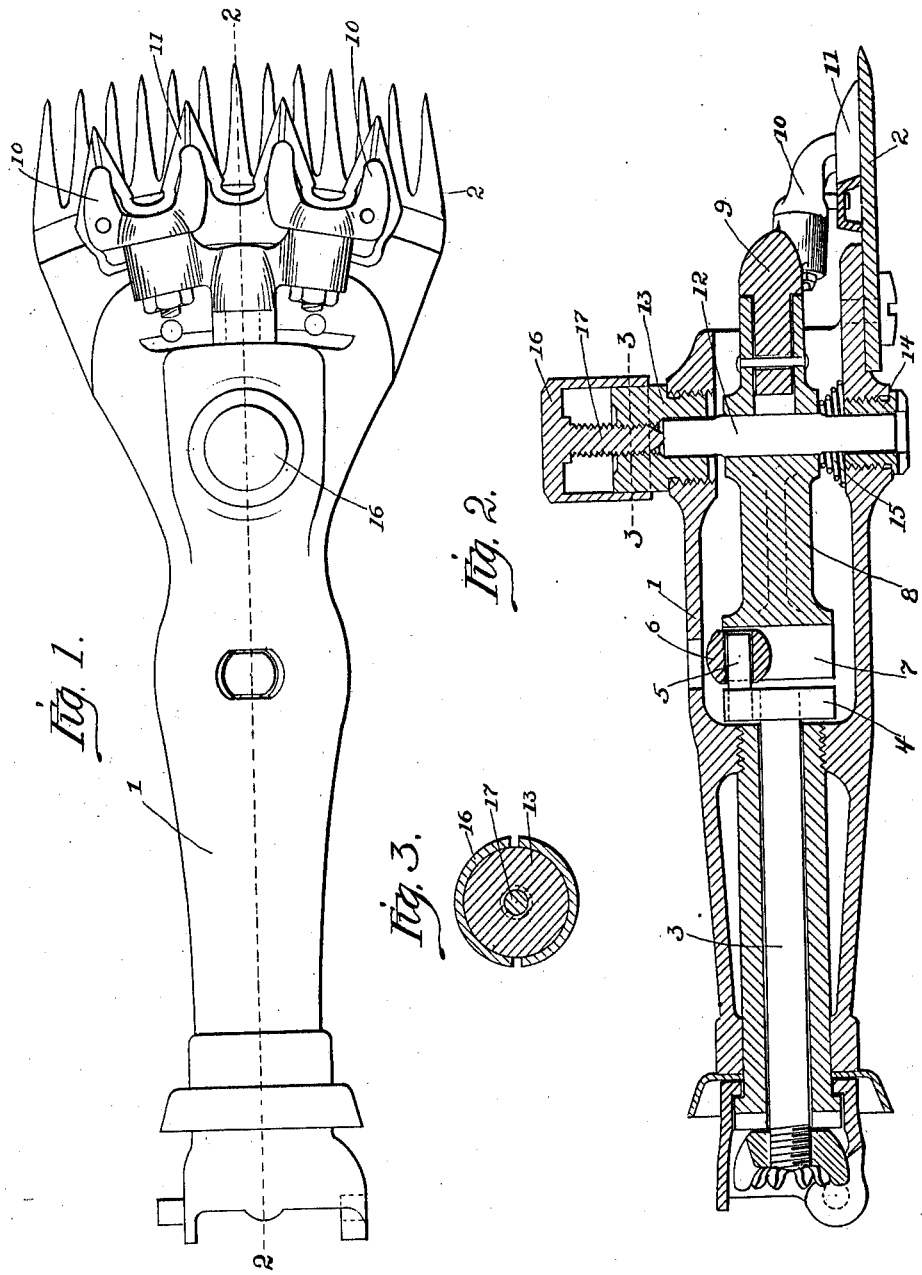

EDWARD A. LARSON, OF CHICAGO, ILLINOIS, ASSIGNOR TO CHICAGO FLEXIBLE SHAFT COMPANY, OF CHICAGO, ILLINOIS, A CORPORATION OF ILLINOIS.

ANIMAL-SHEARS.

989,163.  Specification of Letters Patent.  Patented Apr. 11, 1911.

Application filed March 24, 1909. Serial No. 485,366.

*To all whom it may concern:*

Be it known that I, EDWARD A. LARSON, a citizen of the United States, residing at Chicago, in the county of Cook and State of Illinois, have invented new and useful Improvements in Animal-Shears, of which the following is a specification, reference being had to the drawings forming a part thereof.

The purpose of this invention is to provide an improved implement of the general nature of animal shears specifically shown in the form suitable for sheep shearing.

It consists in the features of construction shown and described as indicated in the claims.

In the drawings:—Figure 1 is a plan view of an implement embodying this invention. Fig. 2 is a section at the line 2—2 on Fig. 1. Fig. 3 is a section at the line 3—3 on Fig. 2.

The implement illustrated in the drawings comprises an integral housing, 1, at the forward end of which there is mounted the cam or fixed shear plate, 2, and in the rear portion of which there is journaled the operating shaft, 3, having at the forward end the crank disk, 4, carrying the crank wrist, 5, and crank ball, 6, which engages in the vertical channel, 7, of the vibrator, 8, which is mounted on a separable vertical fulcrum, as hereinafter more fully described, and at its forward end carries the equalizer, 9, on whose opposite ends there are pivotally mounted for rocking about axes approximately radial to the vertical axis of the vibrator, pressure forks, 10, 10, which engage in a familiar manner the vibrating knife, 11. The construction of the equalizer, 9, and the pivoted pressure forks, 10, for operating the knife, 11, is not the essential part of this invention, being an already familiar construction.

One specific purpose of this invention is to adapt the vibrator to have direct instead of pivotal movement for downward pressure through the medium of the pressure fingers upon the vibrating knife or cutter, 11. For this purpose the vibrator is provided with a vertical axial stem or rock shaft, 12. For convenience of assembling, this stem is arranged to be driven into the vibrator, having a taper too slight to be shown in the drawings, so that it may be driven tight and serve to transmit downward pressure to the vibrator, as hereinafter indicated. Upper and lower bearings, 13 and 14, for this vertical rock shaft, 12, are screwed into the housing from above and below respectively, and a spring, 15, is interposed between the lower plate of the housing and the under side of the vibrator. The separability of the fulcrum post or rock shaft 12 from the vibrator arm 8 and the formation of the housing 1 with a front opening as high as the vertical channel 7 of the vibrator which is engaged for actuating it, permits the introduction of the vibrator into the housing from the forward end and permits the making of the housing in one piece involving very considerable economy in construction and more certainly insuring perfect alinement of the upper and lower bearings of the fulcrum post.

Co-axially with the seat of the upper end of the rock shaft in its bearing, 13, said bearing is drilled and threaded to the upper end, and a cap or closed sleeve, 16, is provided, fitting snugly outside the upper protruding cylindrical portion of said bearing, 13, the sleeve being split to adapt it to operate with a yielding but quite firm grasp upon said cylindrical bearing. Axially within said cap sleeve, protruding from its head or closed end, a threaded stem, 17, is provided for screwing into the threaded axial aperture of the bearing, 13. This axial stem, when the cap is properly screwed down upon the bearing, bears upon the upper end of the vertical rock shaft, 12, and the cap, by virtue of this threaded stem engaged as described, constitutes the means for applying downward pressure to the vibrator to transmit pressure to the vibrating knife. The grasp of the split sleeve upon the cylindrical upper end of the bearing, 13, is designed to be sufficiently firm to serve the purpose which has heretofore been served by a ratchet lock, being, however, much more convenient and compact and at the same time equally secure against accidental disturbance of the adjustment. The spring 15 operates to uplift and uphold the vibrator when the vibrating cutter is to be changed, and thereby greatly adds to the convenience with which this process can be performed.

The details of structure described render it possible to employ an integral housing, as shown, instead of a two-part housing comprising a base and cap which has heretofore been regarded necessary.

I claim:

1. In animal shears comprising a fixed comb or cutter and a vibrating cutter mounted thereon, a vibrator for actuating the vibrating cutter and pressing it onto the fixed cutter; a rock shaft for the vibrator; bearings for the same fixed with respect to the fixed cutter, said shaft being movable longitudinally in its bearings; means for pressing it therein in direction to press the vibrating cutter onto the fixed cutter, and a spring to yieldingly retract it therefrom.

2. In animal shears, in combination with a housing, a fixed comb or cutter secured thereto, a vibrating cutter mounted thereon; a vibrator for actuating the vibrating cutter and pressing it onto the fixed cutter, said vibrator having a vertical rock shaft; upper and lower bearings for said shaft in the housing; a spring interposed between the lower bearing and the vibrator to uphold the latter, and a screw set through the center of the upper bearing impinging upon the center of the upper end of the rock shaft to press the vibrator toward the lower bearing.

3. In animal shears, in combination with a housing, a fixed comb or cutter secured thereto, a vibrating cutter mounted on the fixed cutter, a vibrator having a vertical rock shaft rigid with it; upper and lower bearings for such rock shaft screwed into the top and bottom of the housing; the upper bearing having a cylindrical extension protruding above the housing, and being axially apertured and threaded; a split sleeve closed at the upper end and having an axial threaded stem extending from said closed end within the sleeve and engaging said threaded aperture of the upper housing and impinging upon the upper end of the vibrator rock shaft; said split sleeve being fitted to the cylindrical protruded end of the upper bearing for tightly but yieldingly grasping the same.

4. In animal shears, an integral housing open at the forward end and having a fixed comb or cutter rigid with it; a vibrating cutter and a device for actuating the latter mounted in the housing and protruding through the forward opening thereof for engagement with the vibrating cutter, said actuating device comprising a horizontal vibrating member whose rear part is suitably proportioned to be entered through the forward opening, and a vertical rock shaft for such horizontal member, bearings for the rock shaft in the top and bottom of the housing; the upper bearing being removably mounted therein; the rock shaft being tapered for driving tightly through the horizontal member from above, and means on the upper bearing for stopping the rock shaft vertically.

In testimony whereof, I have hereunto set my hand, in the presence of two witnesses, at Chicago, Illinois, this 15th day of March, 1909.

EDWARD A. LARSON.

In the presence of—
 H. B. ABDELL,
 M. W. MCARDLE.

---

Copies of this patent may be obtained for five cents each, by addressing the "Commissioner of Patents, Washington, D. C."